(12) United States Patent
Blasi Roma

(10) Patent No.: US 12,448,305 B2
(45) Date of Patent: Oct. 21, 2025

(54) ELECTROCHEMICAL REACTOR SYSTEM WITH MEANS FOR THE MAINTENANCE AND CLEANING THEREOF

(71) Applicant: E-WATTS TECHNOLOGIES, S.L., Barcelona (ES)

(72) Inventor: Miquel Blasi Roma, Palamós (ES)

(73) Assignee: E-WATTS TECHNOLOGIES, S.L., Barcelona (ES)

( * ) Notice: Subject to any disclaimer, the term of this patent is extended or adjusted under 35 U.S.C. 154(b) by 269 days.

(21) Appl. No.: 18/276,819

(22) PCT Filed: Feb. 18, 2022

(86) PCT No.: PCT/ES2022/070081
§ 371 (c)(1),
(2) Date: Aug. 10, 2023

(87) PCT Pub. No.: WO2022/175578
PCT Pub. Date: Aug. 25, 2022

(65) Prior Publication Data
US 2024/0124334 A1 Apr. 18, 2024

(30) Foreign Application Priority Data
Feb. 22, 2021 (EP) .................................... 21382141

(51) Int. Cl.
*B08B 3/04* (2006.01)
*B08B 9/00* (2006.01)
(Continued)

(52) U.S. Cl.
CPC ............ *C02F 1/46104* (2013.01); *B08B 9/00* (2013.01); *C02F 1/38* (2013.01); *C02F 1/463* (2013.01);
(Continued)

(58) Field of Classification Search
None
See application file for complete search history.

(56) References Cited

U.S. PATENT DOCUMENTS 4,048,030 A 9/1977 Miller
4,121,991 A 10/1978 Miller et al.
(Continued)

FOREIGN PATENT DOCUMENTS

WO WO2015/021157 * 2/2015
WO 2020/109595 A1 6/2020

OTHER PUBLICATIONS

European Search Report of No. 21382141 dated Aug. 16, 2021.
International Search Report of PCT/ES2022/070081 dated Jun. 1, 2022 [PCT/ISA/210].

*Primary Examiner* — Kaj K Olsen
*Assistant Examiner* — Ryan L Coleman
(74) *Attorney, Agent, or Firm* — Sughrue Mion, PLLC

(57) ABSTRACT

An electrochemical reactor system configured for the maintenance and cleaning thereof, with an electrochemical reactor and an outer hydraulic circuit, connected by a feed inlet and a discharge outlet to the reactor and configured so that in a cleaning mode, the circulation of a cleaning medium formed by a cleaning liquid loaded with abrasive particles can be forced through it. The circuit has a particle recovery branch having, in the direction of circulation of the cleaning medium and downstream from the reactor, a separating mechanism for subtracting the particles from the cleaning medium leaving the reactor, separately obtaining a mass of recovered particles and a current of used cleaning liquid free of particles, and a mechanism for adding particles to a current of cleaning liquid free of particles to form the cleaning medium entering the reactor, which are supplied with recovered particles from the cleaning medium leaving the reactor.

12 Claims, 2 Drawing Sheets

(51) Int. Cl.
*C02F 1/38* (2023.01)
*C02F 1/461* (2023.01)
*C02F 1/463* (2023.01)

(52) U.S. Cl.
CPC ............... *C02F 2001/46119* (2013.01); *C02F 2201/005* (2013.01); *C02F 2301/043* (2013.01); *C02F 2301/046* (2013.01); *C02F 2303/14* (2013.01); *C02F 2303/24* (2013.01)

(56) References Cited

U.S. PATENT DOCUMENTS

2011/0000790 A1 1/2011 Wood et al.
2011/0180424 A1 7/2011 Miller et al.

\* cited by examiner

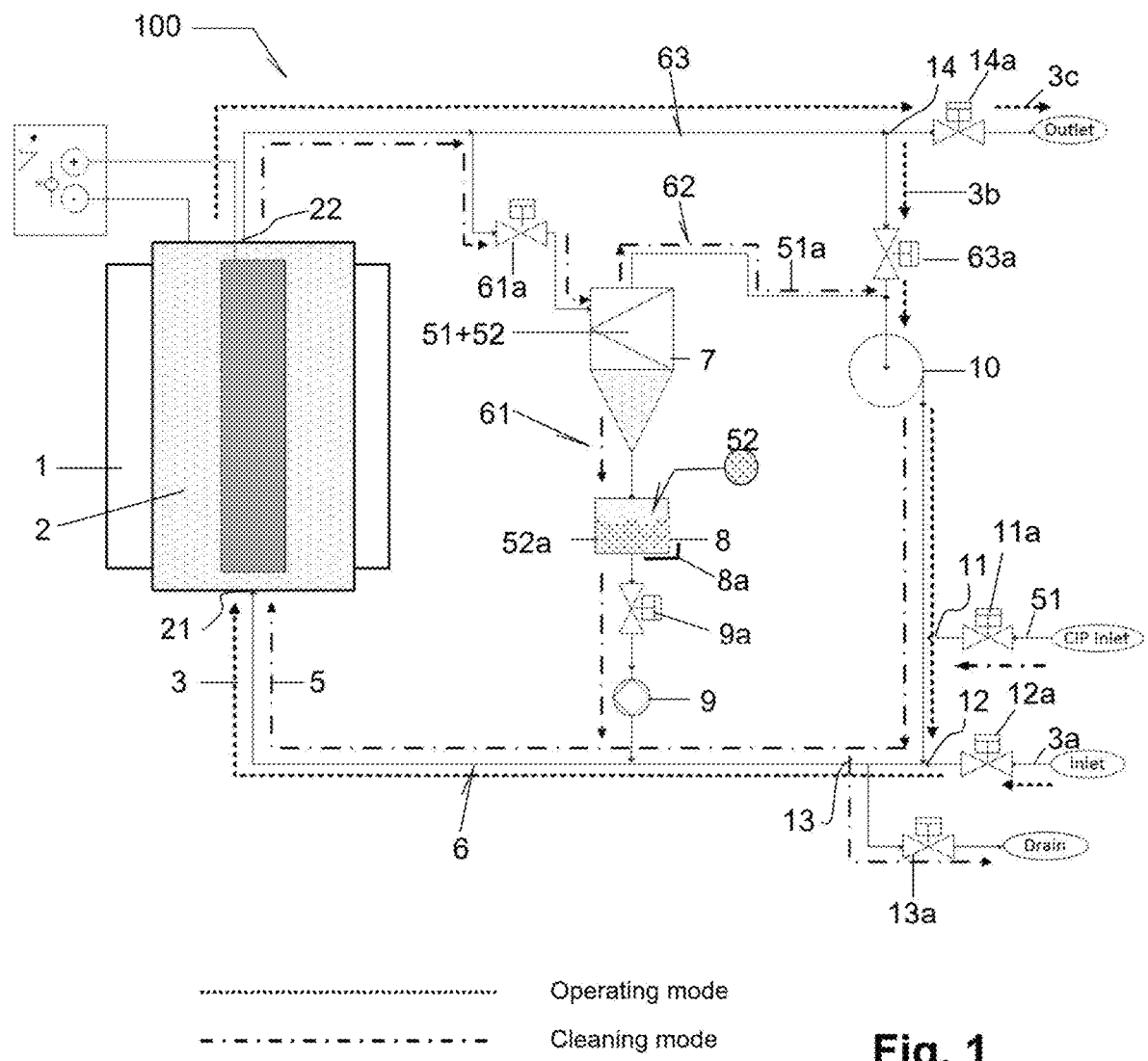
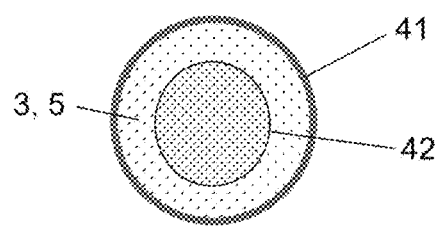

ELECTROCHEMICAL REACTOR SYSTEM WITH MEANS FOR THE MAINTENANCE AND CLEANING THEREOF

CROSS REFERENCE TO RELATED APPLICATIONS

This application is a National Stage of International Application No. PCT/ES2022/070081 filed on Feb. 18, 2022, claiming priority based on European Patent Application No. 21382141.6 filed on Feb. 22, 2021.

TECHNICAL FIELD OF THE INVENTION

The invention relates to an electrochemical reactor system with means for the maintenance and cleaning thereof; as well as a method for cleaning an electrochemical reactor.

BACKGROUND OF THE INVENTION

Electrochemical reactors, such as reactors configured for treating water or liquid waste by electrocoagulation or electroperoxicoagulation, comprise electrodes made of materials such as iron, aluminium or magnesium which are susceptible to physical or chemical fouling or passivation throughout the operation of the reactor.

Different techniques are currently known for reversing and solving this fouling or passivation of the electrodes with the aim of being able to continue operating the reactor within optimum performance margins.

These techniques consist of, or combine, chemical cleaning processes and mechanical cleaning processes.

The chemical cleaning processes are essentially based on circulating chemical solutions through the reactor which undo and remove fouling materials and, with less success, deposits which can form on the electrodes as a result of the passivation; and the mechanical cleaning processes are essentially based on rubbing or scraping the electrodes in order to remove said outer layer of fouling material from the surface thereof and, more successfully, deposits resulting from passivation which may have formed thereon.

As far as mechanical cleaning is concerned, techniques of cleaning with scrapers, cleaning with jets of water and/or air at a certain pressure, ultrasonic cleaning, cleaning by means of the sudden application of changes in polarity in the electrodes or combinations thereof are known.

The technique of cleaning with non-conductive abrasive particles is also known and deserves special attention.

An example of a reactor system adapted to implement mechanical cleaning of this kind is known from patent document EP 2460768, wherein a solution is described in order to alleviate the passivation of the electrodes by means of a self-cleaning system composed of hard abrasive particles, which are confined in a cage permanently arranged inside the reactor and inside of which said particles can move freely, reaching the electrodes, for the bombardment thereof, causing the rupture of the oxide layer which is deposited on the surface thereof.

A conceptually similar solution is described in patent documents U.S. Pat. Nos. 4,121,991 and 4,048,030. Essentially, inside the electrolytic cell of the reactor there is a mass of free movable particles, the density of which is higher than that of the water being treated and such that they cannot leave the electrolytic cell, for which the inlet and outlet of the water from the electrolytic chamber must be adapted.

In these solutions, the abrasive particles operate without interrupting the operation of the reactor. In order to not alter the electrochemical conditions inside the reactor too much, the particles have a non-conductive nature.

These aforementioned mechanical cleaning techniques, which use non-conductive abrasive particles confined inside the reactor, can be differentiated from 3D electrochemical reactor systems with sacrificial particulate anodes which are used to electrochemically purify water using metal particles, particularly anodic particles, able to be applied for example to treat surface water, groundwater, waste water, produced water (congenital water), leachate or aqueous liquid waste. The present invention does not relate to 3D electrochemical reactors; in other words, it is intended for reactors which operate without sacrificial particulate anodes.

An objective of the present invention is an alternative solution to those known.

Another object of the invention is a solution which overcomes drawbacks related to the known solutions.

For example, the coexistence of the abrasive particles with the liquid to be treated, during the treatment of the liquid, limits the possibility of choosing the materials to be used. Materials which alter the electric field or the conditions inside the reactor during the operation thereof must be discarded. In practice, this means having to discard conductive materials, although they could have better mechanical performance and give rise to harder and more efficient particles.

Likewise, the known solutions involve contaminating the water being treated. The abrasive particles wear out and may escape from the confinement thereof. In practice, this can lead to the presence of microparticles in the effluent of the reactor. Furthermore, the fouling material and deposits removed by the particles are also mixed with the liquid being treated.

In relation to the aforementioned consumption of the abrasive particles, a solution which reduces said consumption is desirable, at the same time that it enables this consumption to be controlled or monitored in order to know when, for example, the particles need to be replaced.

DESCRIPTION OF THE INVENTION

In order to respond to the objectives set forth, an electrochemical reactor system with means for the maintenance and cleaning thereof according to claim 1 is proposed.

This system comprises an electrochemical reactor with a chamber which, in an operating mode of the reactor, is passed through by a liquid to be electrochemically purified and wherein means for the electrification of the liquid to be purified, which include electrodes, are arranged for this purpose. Essentially, the system is characterised in that it comprises an outer hydraulic circuit, connected by means of a feed inlet and a discharge outlet to the chamber of the reactor and configured so that in a cleaning mode of the system, the circulation of a cleaning medium can be forced through it, the cleaning medium being formed by a cleaning liquid loaded with abrasive particles and said circuit having a particle recovery branch with the associated shut-off valve thereof having, in the direction of circulation of the cleaning medium and downstream from the reactor, separating means, suitable for subtracting the particles from the cleaning medium leaving the reactor, separately obtaining a mass of recovered particles and a current of used cleaning liquid free of particles, and at least an addition means for adding particles to a current of cleaning liquid free of particles in order to form the cleaning medium entering the reactor, addition means which are supplied with recovered particles from the cleaning medium leaving the reactor.

This system is designed to alternate the operating mode of the reactor with the cleaning mode of the system. In other words, in the cleaning mode of the system, the passage of the liquid to be purified through the reactor will be interrupted and instead the circulation of the cleaning medium, loaded with abrasive particles, will be forced through it, as described in greater detail below.

Likewise, the system is also conceived so that it is possible, in one embodiment, to use the same feed inlet and discharge outlet of the reactor which in the operating mode of the reactor are used to make the liquid to be purified circulate through the inside thereof in order to, in the cleaning mode of the system, make the medium loaded with the particles circulate through said reactor.

In line with the foregoing, a method is also proposed for cleaning an electrochemical reactor with a chamber which in an operating mode of the reactor is passed through by a liquid to be electrochemically purified and wherein means for the electrification of the liquid to be purified, which include electrodes, are arranged for this purpose, the method being characterised in that it comprises draining the chamber of liquid to be purified; and during a mechanical cleaning phase of a cleaning cycle, forcing the circulation of a cleaning medium comprising a cleaning liquid loaded with abrasive particles through the chamber, including;

- subjecting the cleaning medium leaving the reactor to a separation operation with separating means, suitable for subtracting the particles from the cleaning medium leaving the reactor, separately obtaining a mass of recovered particles and a current of used cleaning liquid free of particles,
- collecting the mass of recovered particles, and
- adding recovered particles to a cleaning liquid which may have used cleaning liquid in order to form the cleaning medium entering the reactor.

Advantageously, since the abrasive particles do not coincide with the liquid to be purified inside the reactor, the nature of the abrasive particles can be, if desired, (electrically) conductive. This makes it possible to choose harder and more efficient particles.

Also advantageously, the liquid to be purified is not contaminated with the cleaning medium.

Also advantageously, the consumption of abrasive particles is much lower with respect to those solutions wherein the particles are confined in the chamber of the reactor, since the system is only operated in cleaning mode when the cleaning is necessary or is scheduled.

Also advantageously, the overall electrical consumption is lower, especially in the operating mode of the reactor due to the absence of particles therein. Furthermore, the cleaning is performed in short periods of time since more abrasive and, optionally, conductive particles can be used. In solutions wherein the non-conductive particles are confined in the chamber of the reactor, these particles offer a resistance to the passage of current which increases the voltage and therefore the electrical consumption necessary to maintain the ideal conditions within the chamber in the operating mode of the reactor.

Also advantageously, the consumption of the electrodes is lower with respect to those solutions wherein the particles are confined in the chamber of the reactor. In fact, in the system according to the invention, the abrasive particles only perform the task thereof during the cleaning periods, while in the solutions with particles confined in the reactor, the particles are always in contact with the electrodes and exert the abrasive effect thereof on the electrodes, causing the accelerated wear thereof.

Also advantageously, the recovery of the particles outside the reactor enables the chemical cleaning thereof externally. This makes it possible to reduce the consumption of reagents and to protect the electrodes thereof, in comparison with the solutions wherein the particles are confined inside the reactor, the chemical cleaning of the particles inside the reactor being necessary.

For the cleaning medium comprising a cleaning liquid loaded with abrasive particles, it is possible to use a liquid with loads or without loads of chemical cleaning products, such that it can be chosen if only a mechanical cleaning is performed, selecting water as the cleaning liquid; or if a mechanical cleaning is performed at the same time as a chemical cleaning of the electrodes of the reactor, selecting a cleaning liquid which, in addition to water, incorporates other chemical reagents or products.

Returning to the system of the invention, in a variant of the system, the particle recovery branch has, downstream from the separating means, a collector for recovered particles, equipped with measuring equipment for measuring the mass or amount of recovered particles accumulated in the collector; and said collector supplies the addition means for adding particles to the cleaning medium entering the reactor.

Advantageously, unlike the solutions with particles confined inside the reactor, the consumption of the particles can be easily controlled or monitored. Simple systems can be used to know the mass or amount of abrasive particles accumulated in the collector, for example, at the end of a mechanical cleaning phase of a cleaning cycle. Measurement systems known in the art can be used, such as particle level detection systems in the collector or systems for weighing the mass of particles or of the combined mass of particles and collector.

Accordingly, in a variant of the method according to the invention, the end of the mechanical cleaning phase of a cleaning cycle comprises ceasing to add recovered particles to the cleaning liquid until it passes through the chamber free of particles and accumulating the total of the recovered particles; proceeding to measure the mass or amount of accumulated recovered particles; and providing new particles if the measured amount of accumulated recovered particles is less than a predetermined value with the aim of regenerating the cleaning medium to be used in a following mechanical cleaning phase of the same or of a subsequent cleaning cycle.

In a variant of interest of the system, the separating means comprise a cyclone separator.

In a variant of interest of the system, the addition means combine valve means and an impelling group for particles or a current rich in particles, preferably a peristaltic pump or a self-priming pump with vanes.

In a variant of the system, the hydraulic circuit comprises a recirculation branch for the used cleaning liquid free of particles which is obtained from the separating means in connection with the addition means so that at least one fraction of the cleaning liquid to which recovered particles are added may comprise recirculated used cleaning liquid.

In the context of the present invention, the expression at least one fraction of the cleaning liquid also comprises the fact that all the cleaning liquid to which recovered particles are added is 100% recirculated used cleaning liquid.

In a variant of interest of the system, the recirculation branch for the used cleaning liquid free of particles has liquid impulsion means; an auxiliary supply connection connected to a source of new cleaning liquid with associated auxiliary supply valve means; and a first drain connection of the circuit with associated drain valve means.

In one variant, the circuit also comprises a by-pass branch of the particle recovery branch with the associated shut-off valve thereof which hydraulically connects the outlet of the reactor to the recirculation branch and which enables the circuit to be used with the reactor in operating mode, specifically in order to recirculate through the reactor at least one fraction of purified liquid; the circuit being completed for this purpose with a primary supply connection connected to a source of new liquid to be purified with associated supply valve means and with an extraction connection for extracting purified liquid from the circuit with associated extraction valve means.

Preferably, the primary supply connection connected to a source of new liquid to be purified is located in the recirculation branch of the circuit; and the extraction connection is located in the by-pass branch of the circuit.

BRIEF DESCRIPTION OF THE DRAWINGS

FIG. 1 shows a diagram of a system according to a variant of the present invention;

FIG. 2 is also a schematic figure which exemplifies a typical treatment unit housed in the chamber of an electrochemical reactor, according to a cross-sectional plane.

DETAILED DESCRIPTION OF THE INVENTION

Figure 3:
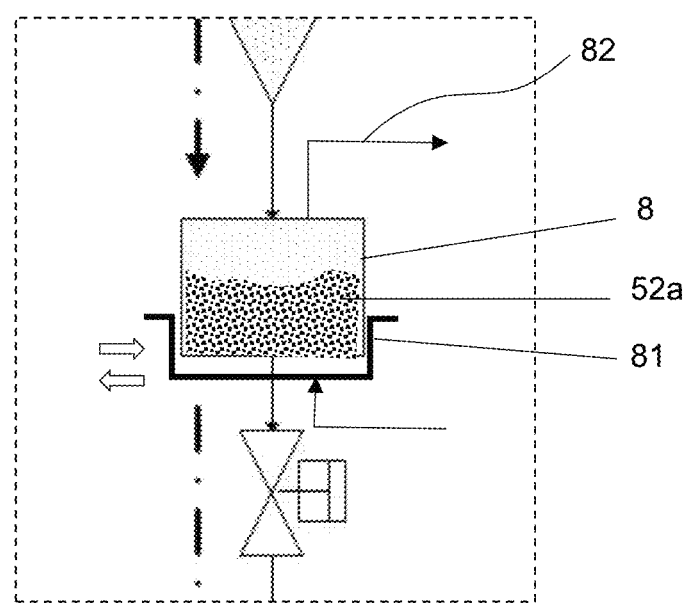
FIG. 3 is a schematic figure of a specific embodiment of the collector for recovered particles, provided with rinsing and agitation means

FIG. 1 shows a diagram of a system 100 for the implementation of the present invention.

Conventionally, the system 100 has an electrochemical reactor 1 with a chamber 2 which in an operating mode of the reactor is passed through by a liquid to be electrochemically cleaned or purified 3 and wherein means for the electrification of this liquid to be purified 3, which include electrodes 41, 42, are arranged for this purpose.

By way of example only, the reactor 1 may be a tubular reactor, provided with one or more treatment units, such as the one represented schematically in FIG. 2, each comprising an outer, hollow tubular electrode 41 which acts as a cathode; and a solid, essentially cylindrical, inner electrode 42 which acts as an anode and which is arranged coaxially inside the electrode 41.

Between the electrodes 41 and 42, an annular space is determined for the transit of the liquid to be purified 3, when the reactor 1 works in operating mode; but also for the transit of a cleaning medium 5, when the system 100 operates in a cleaning mode.

Also in a more or less conventional manner, the system 100 is an intelligent system, with means for monitoring physical parameters from which it can be inferred that the conditions inside the reactor 1, when it works in operating mode and without changing the type of liquid to be purified, have deviated from an optimal pattern which defines certain ideal conditions.

For each type of liquid to be purified 3, the person skilled in the art knows the current intensity in hours/litre that must be applied by the power supply to achieve a desired purification level and which produces a voltage curve over time (due to the fact that the distance between electrodes is a function of the operating hours, said distance varying due to the wear of the electrodes, especially the anode).

Taking advantage of this, for example, the conductivity and temperature of the liquid effluent to be purified 3 is controlled and the information obtained is sent to a controller which also receives information related to the voltage of the power supply. With these three readings, it is automatically determined whether, depending on the two variables of conductivity and temperature of the effluent, the measured instantaneous voltage fits the voltage curve. If the difference between the instantaneous voltage and the voltage curve is greater than a predetermined value, the controller can automatically generate an activation signal of the system 100 in cleaning mode.

The system 100 of FIG. 1 has an outer hydraulic circuit 6 connected by means of a feed inlet 21 and a discharge outlet 22 to the chamber 2 of the reactor 1.

When the reactor 1 works in operating mode, the liquid to be cleaned or purified 3 is introduced and extracted from the chamber 2 through said inlet 21 and outlet 22. The system 100 is nevertheless prepared so that, when the need for cleaning and/or restoration of the electrodes is detected, liquid to be purified 3 stops circulating through the reactor 1 in order for the aforementioned cleaning medium 5 to be circulated in its place during a mechanical cleaning phase of a cleaning cycle.

The possible steps of this cleaning cycle and the features of the system 100 which enable the implementation thereof are explained below with reference to FIG. 1.

In the Operating Mode of the Reactor

In the operating mode of the reactor 1, the flow of liquid through the circuit 6 is illustrated with the line marked as "operating mode" in the legend.

In general terms, the circuit 6 is supplied with new liquid to be purified 3a through the primary supply connection 12 connected to a source of new liquid to be purified 3a, connection enabled by associated supply valve means 12a, and it is led in the direction of the reactor 1 for the introduction thereof by means of the feed inlet 21. Purified liquid 3c leaving the reactor 1 through the discharge outlet 22 is extracted from the circuit 6 through an extraction connection 14, connection enabled by associated extraction valve means 14a. A fraction of purified liquid 3b can be driven by impulsion means 10 back towards the reactor 1, after being mixed with new liquid to be purified 3a so that the flow balance in the circuit 6 remains stable. In this manner, it further contributes to having a flow and minimum velocities of liquid to be purified 3 introduced into the reactor 1 when the availabilities of new liquid to be purified 3a are not sufficient to do so.

The impulsion means 10 may comprise a conventional liquid pump.

Valve means should be understood as any mechanism capable of regulating the flow of the communication between two portions of the system. This comprises both mechanisms with two single end positions to enable or stop the flow and mechanisms with these two end positions and one or more intermediate positions. Likewise, it further comprises mechanisms with two single flow inlet and outlet ports such as mechanisms with more than one flow inlet and/or outlet; being switchable and manually or automatically operable.

In the Cleaning Mode of the System

In the cleaning mode of the system 100, the flow of liquid through the circuit 6 is illustrated with the line marked as "cleaning mode" in the legend.

At the beginning of a cleaning cycle, new liquid to be purified 3a stops being supplied and all the effluent from the reactor 1, which is purified liquid 3c, is extracted from the circuit 6 through the extraction connection 14. An auxiliary drain connection 13 with associated drain valve means 13a may contribute to draining the circuit 6.

In a mechanical cleaning phase of the aforementioned cleaning cycle, the circulation of a cleaning medium 5 comprising cleaning liquid loaded with abrasive particles is forced through the chamber 2 of the reactor 1.

As exemplified below, the cleaning liquid may be formulated comprising components or products with cleaning properties, such that the mechanical cleaning phase of the aforementioned cleaning cycle is actually also chemical cleaning.

In the example, the aforementioned cleaning medium 5 is introduced into the reactor 1 through the same feed inlet 21 and is extracted through the same discharge outlet 22 as the liquid to be purified 3, the reactor 1 working in operating mode. Other variants are possible, wherein the reactor is provided with an inlet and an outlet for the cleaning medium 5 which are different from the inlet and the outlet for the liquid to be purified.

i) In order to proceed to the mechanical cleaning phase of the aforementioned cleaning cycle, first, the circuit 6 can proceed to be primed with new cleaning liquid 51 through the auxiliary supply connection 11 enabled by associated first auxiliary supply valve means 11a.

ii) It is characteristic of the mechanical cleaning phase of the cleaning cycle that it comprises adding abrasive particles to cleaning liquid in order to obtain the cleaning medium 5 which is introduced into the reactor 1 and subjecting the cleaning medium 5 leaving the reactor 1 to a separation operation with separating means 7, suitable for subtracting the particles from the cleaning medium 5 leaving the reactor 1, separately obtaining a mass of recovered particles 52a and a current of used cleaning liquid 51a free of particles; further comprising collecting the mass of recovered particles 52a in a collector 8; and adding recovered particles 52a to cleaning liquid free of particles which may have or be entirely formed by the used cleaning liquid 51a in order to form the cleaning medium 5 which is introduced into the reactor 1.

In practice, the cleaning medium 5, a mixture of cleaning liquid and abrasive particles, is recirculated through the reactor 1 several times, but at the outlet thereof this cleaning medium 5 is separated into a current rich in particles and into a current of used liquid without particles, both currents being led through different conduits of the circuit 6 and driven by different means in order to meet again before the inlet to the reactor 1 in order to produce a new mixture of cleaning liquid and abrasive particles, not necessarily in the same proportion and the particles further being able to have been cleaned if they are reused and/or new particles being able to be added to the mixture which gives rise to the cleaning medium 5 to be introduced into the reactor.

To this end, the circuit 6 has a particle recovery branch 61 with the associated shut-off valve 61a thereof which has, in the direction of circulation of the cleaning medium 5, and downstream from the reactor 1, separating means 7 suitable for subtracting the particles 52 from the cleaning medium 5 leaving the reactor, separately obtaining the current rich in mass of recovered particles 52a and the current of used cleaning liquid 51a free of particles. The recovery branch 61 further has a collector 8 for recovered particles 52a which connects to the outlet of the separating means 7; and at least addition means 9 for adding particles to a current of cleaning liquid free of particles in order to form the cleaning medium 5 entering the reactor 1, addition means 9 which are supplied with recovered particles 52a from the cleaning medium 5 accumulated or collected in the collector 8.

The separating means 7 comprise, in the example, a cyclone separator. The cyclone separator can be, for example, made of stainless steel or polyurethane. Other types of separators can be used depending on the type of abrasive particle to be used, filtration or decantation separators being able to be alternatives to the cyclone separator.

The addition means 9 comprise, in the example, an impeller group, which is peristaltic or self-priming with vanes, and associated valve means 9a. Practical examples compatible with the system are J20, J10 or E-2 series pumps from the supplier Yunk®.

The collector 8 for recovered particles 52a is equipped, in the example, with measuring equipment 8a for measuring the mass or amount of recovered particles 52a accumulated in the collector 8. The application of this measuring equipment is explained later.

In the example, the circuit 6 comprises a recirculation branch 62 for the used cleaning liquid 51a free of particles, which is obtained from the separating means 7, to which the addition means 9 are hydraulically connected so that at least one fraction of the cleaning liquid into which recovered particles 52a are injected, or even the entirety thereof, may comprise recirculated used cleaning liquid 51a.

It should be noted that, in the example, the extraction connection 14 of the circuit 6 is located in a by-pass branch 63 of the particle recovery branch 61 which has associated shut-off valve means 63a, which enable the outlet 22 of the reactor 1 to be hydraulically connected to the recirculation branch 62.

With the reactor 1 working in operating mode, the shut-off valve means 61a of the recovery branch 61 will remain closed and all the effluent, in this case purified liquid, is led towards the extraction connection 14. The control of the extraction valve means 14a and/or the associated shut-off valve means 63a will enable the fraction of effluent, purified liquid, to be recirculated back to the reactor 1 to be established. Naturally, the addition means 9 will be stopped and the appropriate measurements will be taken so that particles contained in the collector 8 are not added to the liquid to be purified 3 which is led to the reactor 1.

During the mechanical cleaning phase of a cleaning cycle, the valve means 61a will be open and the shut-off valve means 63a associated to the by-pass branch 63 will be closed. Likewise, the addition means 9 will be in operation for the addition of recovered particles 52a to the cleaning liquid, preferably formed entirely by used cleaning liquid 51a which is recirculated to the reactor 1, and obtaining the cleaning medium 5 which is led to the reactor 1.

The abrasive particles contained in the cleaning medium 5 hit and rub against the electrodes as they pass through the reactor 1, cleaning and/or regenerating them.

iii) In order to end the mechanical cleaning phase of a cleaning cycle, first, the addition of particles collected in collector 8 to the cleaning liquid which is driven towards the reactor 1 can proceed to be stopped, all the recovered particles 52a staying accumulated in said collector 8.

Simultaneously, partially simultaneously or subsequently, the circuit 6 can proceed to be drained of cleaning liquid, preferably through the drain connection 13. Naturally, if it were open, the auxiliary supply connection 11 is also closed.

iv) A rinsing phase of the circuit 6 can proceed to be carried out, for which a rinsing liquid is introduced into the circuit 6 through, for example, the auxiliary supply connection 11 and the circulation thereof through the reactor 1 is forced by means of the impulsion means 10. In this phase, the valve means of the system are controlled so that the rinsing liquid can circulate through the branches or segments which are to be rinsed.

After the mechanical cleaning phase, all the abrasive particles stay accumulated in the collector 8. This being equipped with measuring equipment 8a for measuring the mass or amount of total particles accumulated in the collector 8, the addition of new abrasive particles starting from a source of new particles 52 can proceed to be carried out if deemed appropriate, for example, if the value of this measurement is below a predetermined threshold. This addition can be automated.

Likewise, as mentioned before, the recovery of the particles outside the reactor in the collector 8 enables the chemical cleaning thereof externally and without these chemicals needing to circulate through the circuit 6. This makes it possible to reduce the consumption of reagents and to protect the electrodes thereof, in comparison with the solutions wherein the particles are confined inside the reactor, the chemical cleaning of the particles inside the reactor being necessary.

In this sense, and according to an embodiment shown in the FIG. 3, the collector 8 is further equipped with agitation means 81 operable in coordination with a rinsing means 82 which force the circulation of a rinsing liquid in an upward direction through the agitated mass of recovered particles 52a contained in the collector 8. The rinsing liquid can be water with or without chemicals. The rinsing means 82 can be a separated circuit from that hydraulically connected to the reactor such that the rinsing liquid used to clean the recovered particles 52a does not reach the reactor.

The agitating means 81 may act within the collector 8 or the collector 8 itself may be agitated. In any case, the agitation of the mass of recovered particles 52a helps to get rid of the dirt adhered thereto and that will be dragged by the rinsing liquid out of the system.

The system 100 of FIG. 1 is designed so that a cleaning cycle can have other phases in addition to the mechanical cleaning phase.

For example, in a manner known on its own, a solely chemical cleaning phase of the reactor 1 can proceed to be performed before or after the mechanical cleaning phase, using a cleaning medium without a load of particles such as one which is water-based with dissolved HCl or other known cleaning products.

EXAMPLES OF IMPLEMENTATION

The invention is exemplified in a system 100 according to FIG. 1, specifically a mechanical cleaning phase of a cleaning cycle, in i) four different reactors: with one treatment unit, five treatment units, nineteen treatment units, and sixty-one treatment units, respectively, each treatment unit of the type illustrated in FIG. 2;

ii) according to several scenarios: at the start and at 50% wear; and iii) starting from the same initial conditions: corresponding to new anodes with a diameter of 50 mm, the inner diameter of the cathode being 56 mm, in each treatment unit.

All this as summarised in the following Table 1.

TABLE 1

Parameters of the reactors and flow conditions in the cleaning mode of the system.

| Reactor Model | eEC-01 | eEC-05 | eEC-19 | eEC-61 |
|---|---|---|---|---|
| No. of treatment units | 1 | 5 | 19 | 61 |
| Reactor parameters | | | | |
| Annular area per treatment unit ($m^2$) | | | 0.00153 | |
| Anode length (m) | | | 0.75000 | |
| Annular/reactor volume (litres) | 1.15 | 5.73 | 21.76 | 69.88 |
| Reactor body diameter (m) | 0.08 | 0.15 | 0.30 | 0.75 |
| Upper chamber height (m) | 0.10 | 0.15 | 0.20 | 0.10 |
| Upper chamber volume (litres) | 0.50 | 2.65 | 14.13 | 44.16 |
| Lower chamber height (m) | 0.15 | 0.10 | 0.15 | 0.15 |
| Lower chamber volume (litres) | 0.75 | 1.77 | 10.60 | 66.23 |
| Initial conditions (anode diameter 50 mm/inner cathode diameter 56 mm) | | | | |
| Total annular area ($mm^2$) | 0.0005 | 0.0025 | 0.0095 | 0.0305 |

TABLE 1-continued

Parameters of the reactors and flow conditions in the cleaning mode of the system.

| Reactor Model | eEC-01 | eEC-05 | eEC-19 | eEC-61 |
|---|---|---|---|---|
| No. of treatment units | 1 | 5 | 19 | 61 |
| Equivalent diameter (mm) | 25 | 56 | 110 | 197 |

| Inner speed of anode/cathode (m/s) | eEC-01 Circulation flow rate ($m^3/h$) | eEC-05 Circulation flow rate ($m^3/h$) | eEC-19 Circulation flow rate ($m^3/h$) | eEC-61 Circulation flow rate ($m^3/h$) |
|---|---|---|---|---|
| 0.20 | 0.36 | 1.80 | 6.83 | 21.94 |
| 0.50 | 0.90 | 4.50 | 17.08 | 54.85 |
| 0.75 | 1.35 | 6.74 | 25.63 | 82.27 |
| 1.00 | 1.80 | 8.99 | 34.17 | 109.69 |

Wear scenario (anode diameter 25 mm)

| Total annular area ($mm^2$) | 0.0015 | 0.0076 | 0.0290 | 0.0932 |
|---|---|---|---|---|

Reactor parameters

| Equivalent diameter (mm) | 44 | 99 | 192 | 345 |
|---|---|---|---|---|

| Inner speed of anode/cathode (m/s) | eEC-01 Circulation flow rate ($m^3/h$) | eEC-05 Circulation flow rate ($m^3/h$) | eEC-19 Circulation flow rate ($m^3/h$) | eEC-61 Circulation flow rate ($m^3/h$) |
|---|---|---|---|---|
| 0.20 | 1.10 | 5.50 | 20.89 | 67.08 |
| 0.50 | 2.75 | 13.75 | 52.24 | 167.70 |
| 0.75 | 4.12 | 20.62 | 78.35 | 251.56 |
| 1.00 | 5.50 | 27.49 | 104.47 | 335.41 |

Preferably, the circulation speed of the medium through the treatment units will be at least 0.5 m/s; therefore, starting from a speed of 1 m/s in initial conditions, the flow rate will increase by approximately 50% when the wear scenario in Table 1 is reached.

Below are examples of a water-based cleaning medium to be used, optionally with dissolved HCl, using different types of abrasive particles.

TABLE 2

Parameters for several cleaning medium alternatives.

Cleaning liquid solution (water-based)

| Optional percentage % HCl | 2% | | | |
|---|---|---|---|---|
| Reactor Model | eEC-01 | eEC-05 | eEC-19 | eEC-61 |
| Amount of cleaning reagent per wash. | 0.05 Kg/wash | 0.20 Kg/wash | 0.93 Kg/wash | 3.61 Kg/wash |

| | Diameter | Density | Decantation speed | Hardness |
|---|---|---|---|---|
| Abrasive particles | | | | |
| Brown Corundum | 0.30 mm | 3.90 gr/$cm^3$ | 141.56 mm/s | 9 on the Mohs scale |
| Ceramic | 0.30 mm | 3.80 gr/$cm^3$ | 141.56 mm/s | 7-7.5 on the Mohs scale |
| Cleaning liquid solution (water-based) | | | | |
| Garnet Sand | 0.20 mm | 4.10 gr/$cm^3$ | 62.92 mm/s | 7.5 on the Mohs scale |

TABLE 2-continued

Parameters for several cleaning medium alternatives.

Cleaning liquid solution (water-based)

| Optional percentage % HCl | 2% | | | |
|---|---|---|---|---|
| Reactor Model | eEC-01 | eEC-05 | eEC-19 | eEC-61 |

Cleaning medium

| Percentage % particles (by weight) | 5% | | | |
|---|---|---|---|---|
| Reactor Model | eEC-01 | eEC-05 | eEC-19 | eEC-61 |
| Abrasive mass | 0.12 Kg/wash | 0.51 Kg/wash | 2.32 Kg/wash | 9.01 Kg/wash |

The invention claimed is:

1. An electrochemical reactor system with means for the maintenance and cleaning thereof, comprising:
an electrochemical reactor with a chamber and means for performing electrification of liquid in order to purify the liquid in an operating mode of the reactor, wherein the liquid is passed through the chamber in the operating mode of the reactor, and wherein the means for performing electrification comprises electrodes;
an outer hydraulic circuit, connected to a feed inlet of the chamber and to a discharge outlet of the chamber and configured so that, in a cleaning mode of the system, circulation of a cleaning medium can be forced through the chamber, the cleaning medium being formed by a cleaning liquid loaded with abrasive particles and said circuit having a particle recovery branch with a shut-off valve downstream from the reactor;
separating means for separating the abrasive particles from the cleaning medium such that a mass of recovered abrasive particles and a current of used cleaning liquid are produced by the separating means, wherein the separating means is located in the particle recovery branch, and wherein the current of used cleaning liquid flows through a liquid pathway that can channel liquid to the feed inlet of the chamber;
an addition means for adding abrasive particles to a current of cleaning liquid flowing toward the feed inlet of the chamber in order to form cleaning medium entering the reactor, wherein the addition means is positioned on the particle recovery branch and downstream of the separating means such that the addition means is configured to receive abrasive particles separated from cleaning liquid by the separating means.

2. The system according to claim 1, wherein the particle recovery branch has, downstream from the separating means, a collector for recovered particles, and wherein the collector supplies the addition means with abrasive particles.

3. The system according to claim 2, wherein a mass or amount of recovered particles accumulated in the collector can be measured.

4. The system according to any of claim 2 wherein the collector is further equipped with agitation means operable to agitate a mass of abrasive particles contained in the collector, and wherein the collector further comprises a rinsing means for circulating rinse liquid in an upward direction through the agitated mass of abrasive particles.

5. The system according to claim 1, wherein the separating means comprises a cyclone separator.

6. The system according to claim 1, wherein the addition means comprises a peristaltic pump or a self-priming pump with vanes and wherein a valve means is upstream of the addition means.

7. The system according to claim 1, wherein the hydraulic circuit comprises a recirculation branch for used cleaning liquid from which abrasive particles have been removed by the separating means and wherein the recirculation branch is connected to the addition means so that at least one fraction of cleaning liquid into which recovered particles are injected comprises recirculated used cleaning liquid.

8. The system according to claim 7, wherein the recirculation branch of used cleaning liquid has a liquid impulsion means, a first auxiliary supply connection able to be connected to a source of new cleaning liquid, and a first outlet or drain connection of the circuit.

9. The system according to claim 7, wherein the circuit comprises a by-pass branch, wherein the by-pass branch hydraulically connects the discharge outlet of the chamber to the recirculation branch and enables the circuit to be used with the reactor in operating mode, specifically in order to recirculate through the reactor at least one fraction of purified liquid, wherein the circuit comprises a primary supply connection connected to a source of new liquid to be purified, and wherein the circuit comprises an extraction connection for extracting purified liquid from the circuit.

10. The system according to claim 9, wherein the primary supply connection connected to a source of new liquid to be purified is located in the recirculation branch of the circuit, and the extraction connection is located in the by-pass branch of the circuit.

11. A method for cleaning an electrochemical reactor with a chamber which in an operating mode of the reactor electrifies liquid that passes through the reactor in order to purify the liquid, wherein the electrification of the liquid is performed with electrodes in the chamber, and wherein the method comprises:
draining the chamber of the liquid;
forcing circulation of a cleaning medium comprising a cleaning liquid loaded with abrasive particles through the chamber, wherein an outer hydraulic circuit is connected to the chamber by means of a feed inlet of the chamber and a discharge outlet of the chamber, and wherein the cleaning medium enters the chamber by the feed inlet and exits the chamber by the discharge outlet;
downstream of the reactor, subjecting the cleaning medium to a separation operation with separating means for separating abrasive particles from the cleaning medium, separately obtaining a mass of recovered abrasive particles and a current of used cleaning liquid, wherein the separating means is located in a particle recovery branch downstream of the discharge outlet, and wherein the current of used cleaning liquid flows through a liquid pathway that can channel liquid to the feed inlet of the chamber;

collecting the mass of recovered abrasive particles, upstream of the reactor, adding some of the recovered abrasive particles to a cleaning liquid in order to form cleaning medium entering the reactor, wherein said adding of the recovered abrasive particles is performed with an addition means for adding abrasive particles into cleaning liquid flowing towards the reactor, and wherein the addition means is positioned on the particle recovery branch and downstream of the separating means.

12. The method according to claim 11, wherein the method further comprises:

ceasing to add recovered abrasive particles to cleaning liquid and accumulating recovered abrasive particles, the method further comprising at least one of measuring the mass or amount of the accumulated recovered abrasive particles and providing new particles if the value of this measurement is less than a predetermined value; and subjecting the accumulated recovered abrasive particles to a washing process.

* * * * *